Patented May 31, 1938

2,119,155

UNITED STATES PATENT OFFICE 2,119,155

METHOD OF REDUCING POTATOES AND OTHER STARCH-CONTAINING VEGETABLES TO THE FORM OF A DRY POWDER

Arnold Faitelowitz, Suresnes, France, assignor of seventy-five per cent to Marcos Bunimovitch, Brussels, Belgium No Drawing. Application June 3, 1937, Serial No. 146,315. In Great Britain June 10, 1936

8 Claims. (Cl. 99—207)

This invention relates to a method of reducing potatoes and other starch-containing vegetables to the form of a dry powder and has for its object the preparation of a powdered product which shall have good keeping properties and which, after the addition of water or milk, may be employed in the preparation of dishes such as mashed potatoes, purees, soups and the like and having the same taste and consistency as similar dishes prepared from the fresh vegetables.

Potatoes and other starch-containing vegetables have previously been reduced to dry powders in various ways but the products are unsatisfactory for the reason that the dishes prepared therefrom differ considerably in taste and consistency from those for which fresh vegetables are utilized.

It has been determined by microscopical comparison of the structure of the starch contained in a dish prepared from a known potato or like powder with that of the starch contained in dishes prepared from fresh vegetables that in the first case the greater part of the starch is in the hydrated gelatinous form (i. e. the walls of the starch cells or granules have been ruptured) whereas the opposite is true in the other case. The differences in taste and consistency are directly due to these facts.

As the result of numerous experiments it has been found that the starch-content of potatoes and other starch-containing vegetables may be preserved in its initial form throughout the drying of the vegetables provided that certain essential conditions be observed.

The process of the present invention consists in reducing potatoes and other starch-containing vegetables to the form of a dry powder in which the starch is preserved in its initial form by cooking the vegetables at a temperature which must not substantially exceed 100° C., cutting the cooked vegetables into small pieces, partially drying the pieces, at a temperature which also must not substantially exceed 100° C., until they have lost at the most about 60% by weight of their initial water-content, reducing the partially dried pieces to the form of a moist powder and further drying the moist powder, at a temperature which must not greatly exceed 80° C., until it has a water-content of approximately 10–15% by weight.

A further feature of the process is continually agitating the moist powder while it is being dried.

Yet a further feature is cooking the vegetables by means of a steam-cooking operation during which they lose part of their water-content.

In order that the invention may be clearly understood, there will now be described in greater detail one way in which it may be carried into effect as applied, for example, to the production of a potato powder.

The potatoes are peeled and subjected, preferably while whole, to a steam-cooking operation during which they lose a considerable proportion of their water-content. The cooking operation is preferably carried out in a double-walled vessel or other suitable apparatus and is effected at a temperature of 100° C. or slightly more but not exceeding 105° C. A suitable apparatus is a jacketed container into which the peeled potatoes are placed contained in an open basket (or a series of foraminous trays) which supports them clear of the bottom of the container. A small quantity of water is introduced into the latter and this is then closed by a lid or cover having mounted thereon an automatic pressure-release valve arranged to open as soon as the pressure within the container rises above atmospheric pressure. The jacket space is supplied with steam under pressure from a suitable source and the water in the container becomes converted into steam which cooks the potatoes. The cooking is usually completed in about 15 minutes. Should the pressure within the container tend to rise above that of the atmosphere some of the steam contained therein is permitted to escape by way of the automatic valve.

During the steam-cooking operation a proportion, usually about 16% by weight of the water contained in the potatoes is converted into steam and this escapes into the atmosphere (either during the actual cooking operation or as soon as the lid or cover is removed from the container). It is not essential, although it is preferred, to employ a steam-cooking operation since ordinary boiling of the potatoes in water will effectively cook them without, however, reducing their water-content.

The cooked potatoes are removed from the cooking vessel and cut into small pieces which are then subjected to a drying operation until they reach the stage when they can be easily grated or crushed into a moist powder. This stage is usually reached when the potatoes have lost about 50 to 60% in weight calculated on the initial weight of the raw potatoes. If the potatoes have been insufficiently dried they yield on grating or crushing a glutinous dough the complete drying of which (even at comparatively low temperatures) leads to a product in which the starch-content is in the hydrated or glutinous form. The temperature at which this drying operation is effected may vary but it should not substantially exceed 100° C., i. e. it should not exceed 105° C.

When the partially dried chopped potatoes have been converted into the form of a moist powder, a final drying operation is carried out at any suitable temperature which must not substantially exceed 80° C., i. e. not higher than 85° C. During this final drying it is advantageous to keep the powder continually in motion, for example by continuously stirring the same, in order to ensure homogeneous drying of the particles throughout the mass. The final drying must not be continued beyond the point at which the water-content of the powder has been reduced to from about 10 to 15% by weight. The product obtained will nevertheless have the appearance, feel and properties of a dry powder and the particles will not adhere together after the application of moderate pressure.

Any suitable drying apparatus may be employed for partially drying the pieces of potato and for finally drying the potato powder and either or both of these operations may be carried out in stages and/or under a reduced pressure if desired.

The dry powder obtained is generally pale cream in colour and can be stored for long periods, in the same manner as any kind of flour, without undergoing any change. When mixed with water or milk and the other necessary ingredients the powdered product reabsorbs water and may be employed in the preparation of dishes such as mashed potatoes, purees, soups and the like which are of the same taste and consistency as similar dishes prepared from fresh potatoes but require much less time for their preparation. For example, a dish of mashed potatoes may be prepared by placing 2 ounces of the potato powder, 6 ounces of water, 1 pat of butter, two tablespoonfuls of milk and pepper and salt to taste in a double saucepan, bringing the water in the outer container to the boil and allowing to stand for 2 minutes. The dish is then ready to serve.

Having now fully described my said invention, what I claim and desire to secure by Letters Patent, is:

1. A method of reducing potatoes and other starch-containing vegetables to the form of a dry powder in which the starch is preserved in its initial form which comprises cooking the vegetables at a temperature which must not substantially exceed 100° C., cutting the cooked vegetables into small pieces, partially drying the pieces, at a temperature which also must not substantially exceed 100° C. until they have lost at the most about 60% by weight of their initial water-content, reducing the partially dried pieces to the form of a moist powder and further drying the moist powder, at a temperature which must not greatly exceed 80° C., until it has a water-content of approximately 10–15% by weight.

2. A method as claimed in claim 1, in which the moist powder is continually agitated while it is being dried.

3. A method as claimed in claim 1, in which the vegetables are cooked by means of a steam-cooking operation during which they lose part of their water-content.

4. A method as claimed in claim 1, in which the partial drying of the pieces is such as to cause them to lose 50 to 60% in weight calculated on the weight of the raw vegetables.

5. A method as claimed in claim 1, in which the partially dried chopped vegetables are grated or crushed to produce the moist powder.

6. A method as claimed in claim 1, wherein the drying is carried out in stages.

7. A method as claimed in claim 1, wherein the drying is carried out in stages and under a reduced pressure.

8. A method as claimed in claim 1, wherein the drying is carried out under a reduced pressure.

ARNOLD FAITELOWITZ.